(12) United States Patent
Hanshaw et al.

(10) Patent No.: US 8,904,978 B2
(45) Date of Patent: Dec. 9, 2014

(54) VARIABLE CAM TIMING SYSTEM AND METHOD

(71) Applicant: Ford Global Technologies, LLC, Dearborn, MI (US)

(72) Inventors: Jamie Charles Hanshaw, South Lyon, MI (US); Jonathan Denis Crowe, Northville, MI (US); John Eric Rollinger, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 131 days.

(21) Appl. No.: 13/667,665

(22) Filed: Nov. 2, 2012

(65) Prior Publication Data
US 2014/0123921 A1 May 8, 2014

(51) Int. Cl.
*F01L 1/34* (2006.01)
(52) U.S. Cl.
USPC ............... 123/90.17; 123/90.15; 464/160

(58) Field of Classification Search
USPC .................. 123/90.15, 90.17; 464/160
See application file for complete search history.

(56) References Cited

U.S. PATENT DOCUMENTS

| | | | |
|---|---|---|---|
| 5,768,044 A | 6/1998 | Hetzler et al. | |
| 6,330,870 B1 | 12/2001 | Inoue et al. | |
| 6,386,164 B1 | 5/2002 | Mikame et al. | |
| 6,684,835 B2 * | 2/2004 | Komazawa et al. | 123/90.17 |
| 6,932,039 B2 * | 8/2005 | Takahashi et al. | 123/90.17 |
| 6,941,913 B2 | 9/2005 | Smith | |
| 7,421,989 B2 * | 9/2008 | Fischer et al. | 123/90.17 |
| 2004/0079309 A1 | 4/2004 | Kinugawa | |

* cited by examiner

*Primary Examiner* — Ching Chang
(74) *Attorney, Agent, or Firm* — James Dottavio; Alleman Hall McCoy Russell & Tuttle LLP (57) ABSTRACT

A method for operation of an engine is provided. The method includes operating an engine with independent variable intake and exhaust valve timing with an intake valve timing actuator and an exhaust valve timing actuator, locking both the intake and exhaust valve timing actuators in a mid-lock position, and unlocking both the intake and exhaust valve timing actuators via a common locking-control valve.

19 Claims, 5 Drawing Sheets

VARIABLE CAM TIMING SYSTEM AND METHOD

FIELD

The present disclosure relates to a system and method for controlling variable cam timing.

BACKGROUND AND SUMMARY

Variable cam timing (VCT) systems are used in internal combustion engines to advance or retard valve timing, to thereby adjust combustion operation over a range of engine operating conditions. Adjusting valve timing in this way increases combustion efficiency and engine power output, and reduces emissions.

To fix the range of valve advancement or retardation, fully advanced and fully retarded locking devices are used in some VCT systems. Mid-locking devices may also be in VCT systems to substantially fix the cam phasing in a position between fully advanced and fully retarded (e.g., a neutral position) during certain operating conditions. U.S. Pat. No. 6,330,870 discloses an engine with an intake and exhaust lock mechanism for locking the intake and exhaust valve timing adjusters in intermediate positions between fully retarded and fully advanced positions. Separate hydraulic control valves are used to control the intake lock mechanism and the exhaust lock mechanism.

However, the Inventors have recognized several drawbacks with the VCT system disclosed in U.S. Pat. No. 6,330,870 as well as other mid-locking VCT systems. For example, a large number of hydraulic valves are used for providing the mid-locking functionality. For example, U.S. Pat. No. 6,330,870 provides a separate hydraulic control valve for each mid-locking mechanism. In other systems, two separate valves may be used to control each mid-locking device (e.g., an intake-side mid-locking device and an exhaust-side mid-locking device). Moreover, in some VCT systems, separate hydraulic valves may be used to adjust the phasing of the valve timing actuators. As result, the cost and complexity of the VCT system is increased. Moreover, when the number of parts in the VCT system is increased, the likelihood of component malfunction and repair/warranty costs is increased. These problems may be exacerbated in engines having two cylinder banks, such as V-type engines, resulting in another doubling of the number of hydraulic valves in the VCT system.

The Inventors herein have recognized the above issues and identified a method for operation of an engine is provided. The method includes operating an engine with independent variable intake and exhaust valve timing with an intake valve timing actuator and an exhaust valve timing actuator, locking both the intake and exhaust valve timing actuators in a mid-lock position, and unlocking both the intake and exhaust valve timing actuators via a common locking-control valve. For example, by hydraulically linking the locking/unlocking devices of both the intake and exhaust phasers with a mid-lock position on a cylinder bank to a common control valve, electronic control of the common valve can control locking/unlocking of both the intake and exhaust camshafts concurrently. Further, it is possible to do so while still maintaining desired performance for both the intake and exhaust phasers during various operating conditions, including cold starting.

In this way, the number of control valves in the VCT system may be reduced when compared to VCT systems which may include one or more control valves per locking mechanism. As a result, the cost and complexity of the engine may be reduced. Moreover, repair costs for the VCT system may be reduced and the likelihood of VCT malfunction may also be reduced.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

BRIEF DESCRIPTION OF THE DRAWINGS

FIG. 4 is drawn approximately to scale, however other relative dimensions may be used if desired.

DETAILED DESCRIPTION

The following description relates to an approach for controlling two or more mid-locking mechanisms in a variable cam timing (VCT) system with a common locking-control valve, to decrease cost and complexity of the engine. The common locking-control valve enables the locking and subsequent unlocking of intake cam phasers and exhaust cam phasers in or from a mid-lock position between an advanced and retarded position. For example, no other locking-control valves may be used for the intake cam phaser and exhaust cam phaser, other than the common locking-control valve. In this way, each of the intake and exhaust cam phasers may be controlled through a common locking-control valve, thereby simplifying the VCT system. Such an approach is especially suited to mid-locking of the intake/exhaust camshafts on a common cylinder bank because both camshafts are maintained in the mid-lock position during a start. For example, upon reaching a desired engine speed and/or oil pressure, both intake and exhaust valves are commanded to unlock concurrently. Before this instance, both intake and exhaust camshafts are maintained in their respective mid-lock positions. Likewise, during an engine shutdown, both intake and exhaust camshafts are sent to the mid-lock position at a common instance.

Figure 1:
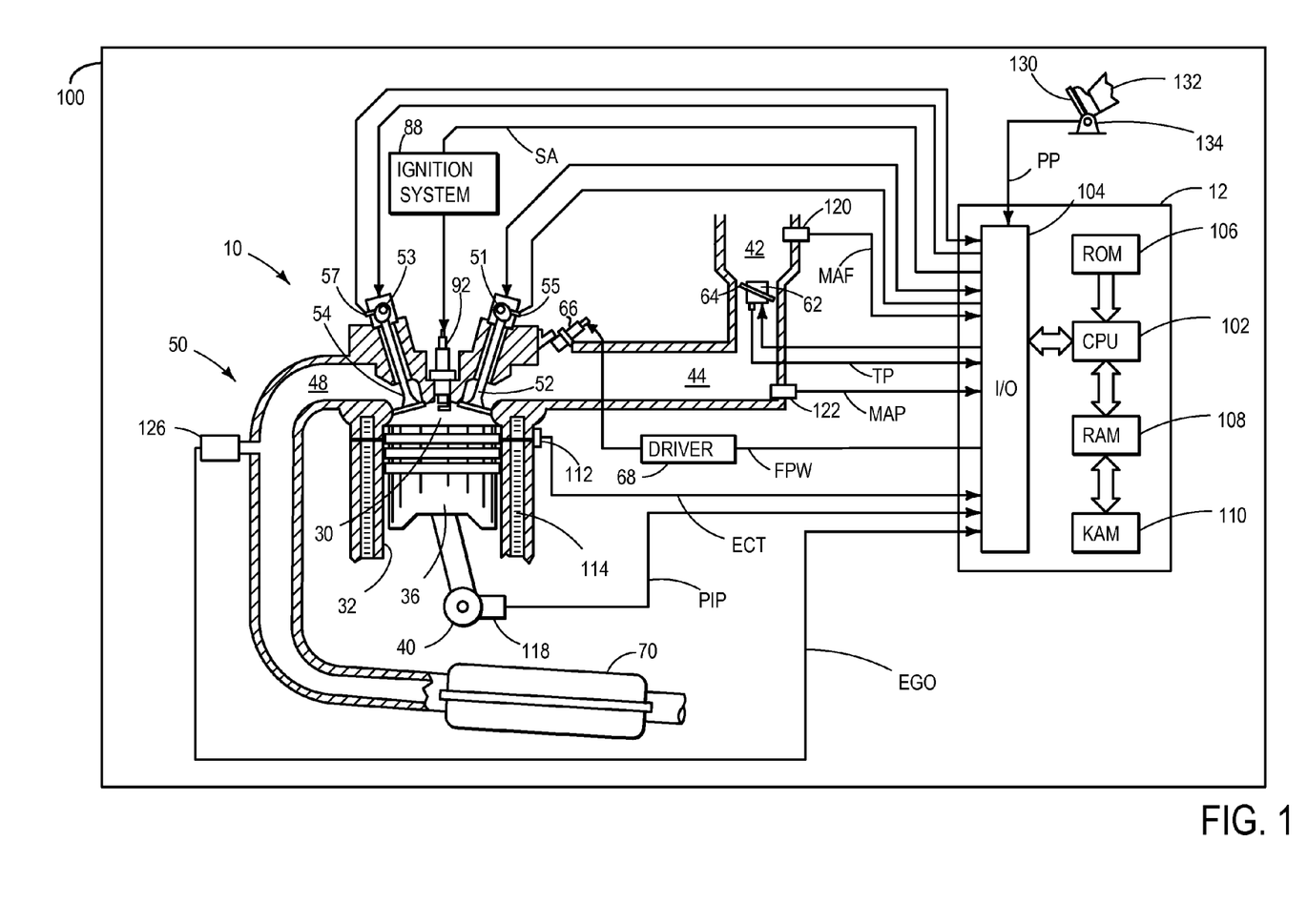
FIG. 1 shows a schematic depiction of a vehicle including an internal combustion engine.
Figure 2:
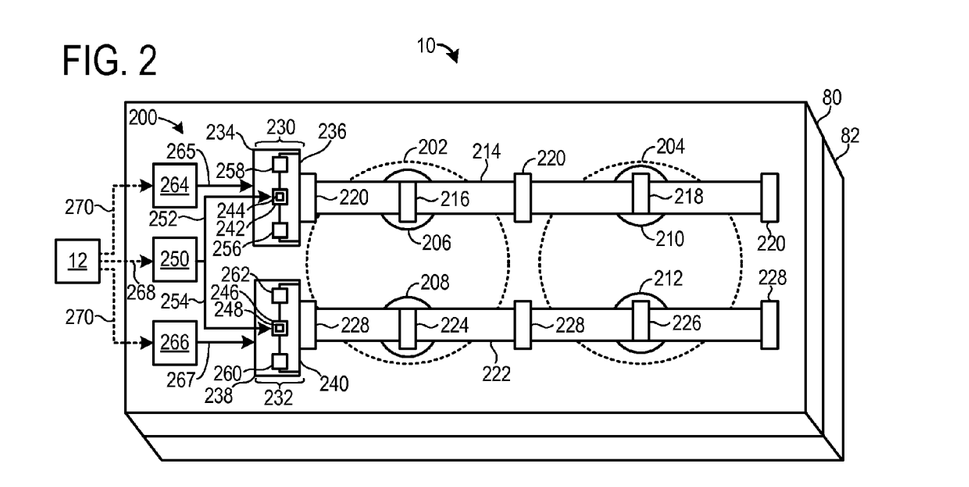
FIG. 2 shows a schematic depiction of a variable cam timing (VCT) system included in the engine shown in FIG. 1.
Figure 3:
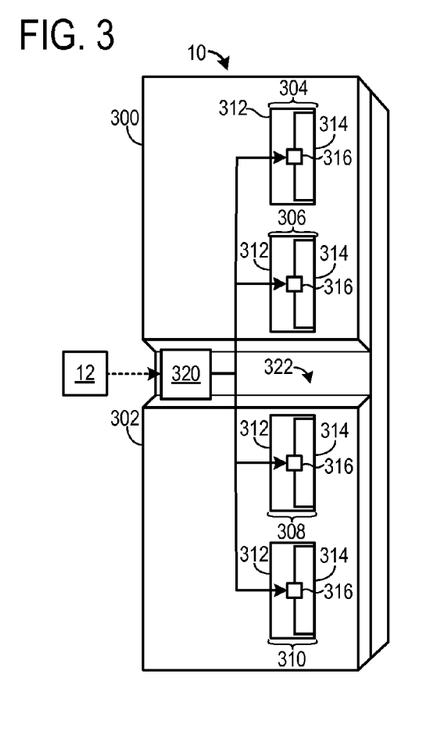
FIG. 3 shows a schematic depiction of another example VCT system included in the engine shown in FIG. 1.
Figure 4:
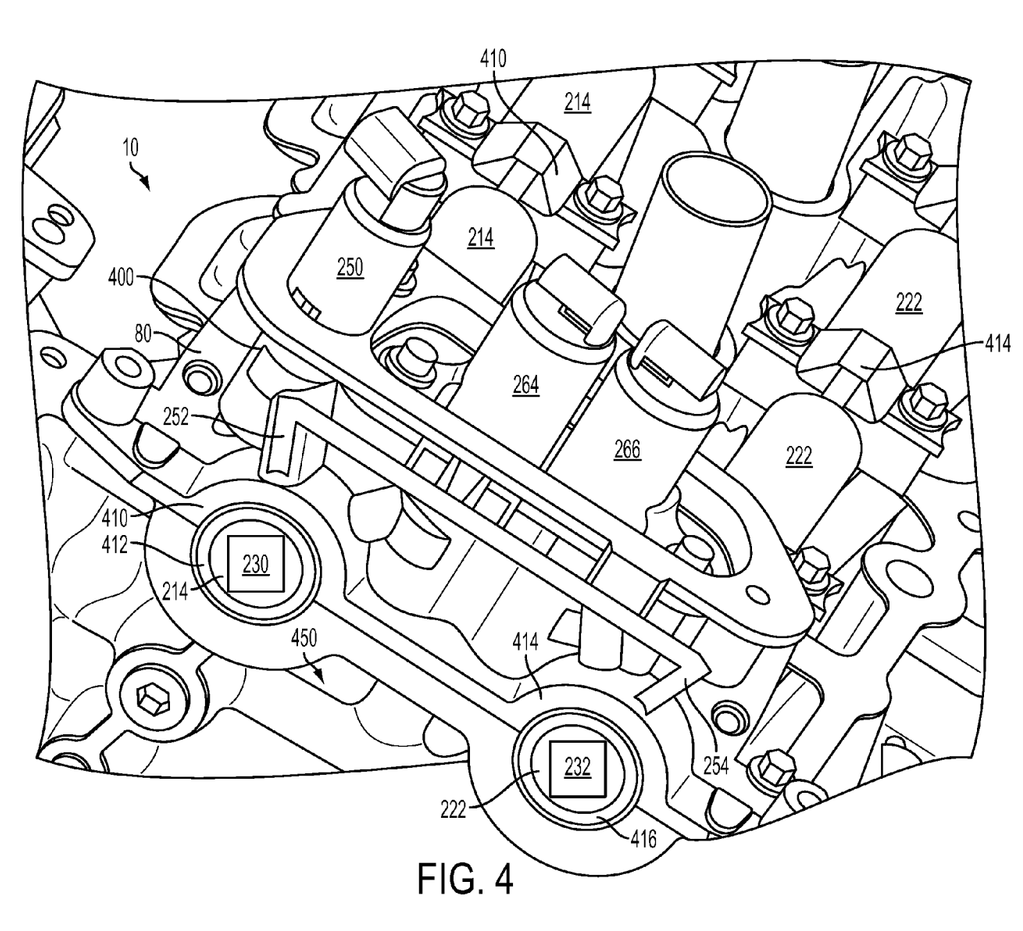
FIG. 4 shows an illustration of an example engine.
Figure 5:
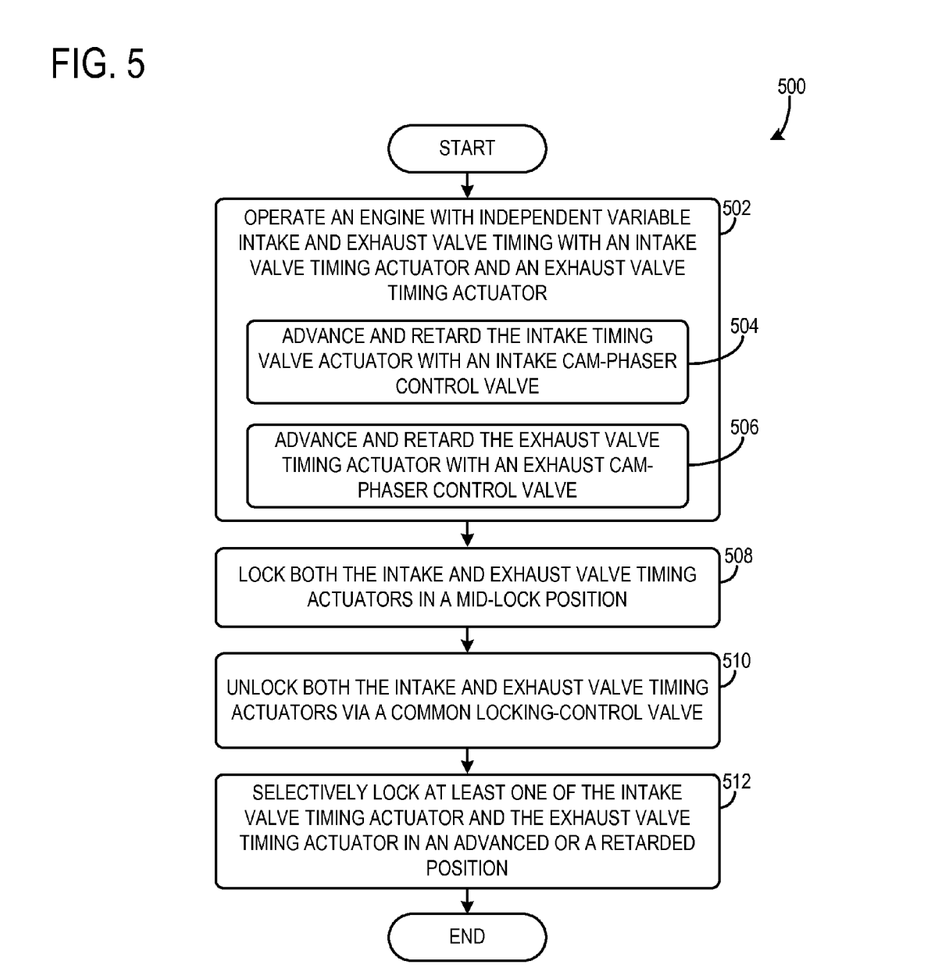
FIGS. 5 and 6 show methods for operation of an engine.
Figure 6:
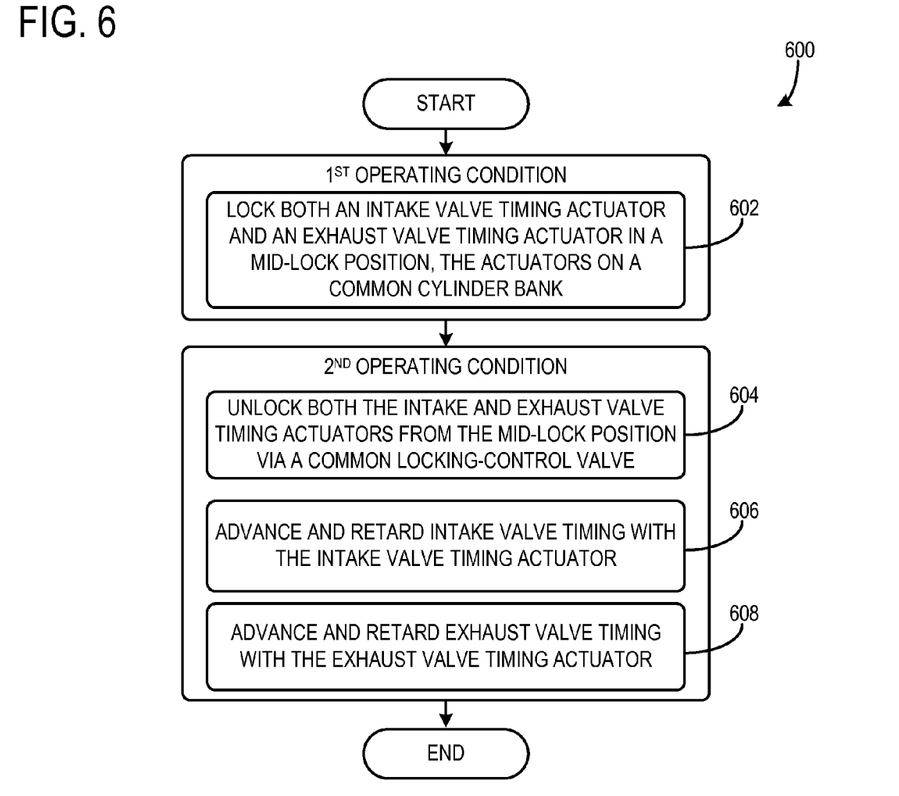

FIG. 1 shows a schematic depiction of a vehicle including an engine. FIGS. 2 and 3 show example VCT systems that may be included in the engine shown in FIG. 1. FIG. 4 shows an illustration of an example engine and FIGS. 5-6 show methods for operation of an engine.

FIG. 1 is a schematic diagram showing one cylinder of multi-cylinder engine 10, which may be included in a propulsion system of a vehicle 100 in which an exhaust gas sensor 126 (e.g., air-fuel sensor) may be utilized to determine an air fuel ratio of exhaust gas produce by engine 10. The air fuel ratio (along with other operating parameters) may be used for feedback control of engine 10 in various modes of operation. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Cylinder (i.e., combustion chamber) 30 of engine 10 may include combustion chamber walls 32 with piston 36 positioned therein. A cylinder head 80 is coupled to a cylinder block 82 to form the cylinder 30.

Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Cylinder 30 may receive intake air from intake manifold 44 via intake passage 42 and may exhaust combustion gases via exhaust passage 48. Intake manifold 44 and exhaust passage 48 can selectively communicate with cylinder 30 via respective intake valve 52 and exhaust valve 54. In some embodiments, cylinder 30 may include two or more intake valves and/or two or more exhaust valves. A throttle 62 including a throttle plate 64 is positioned in the intake passage 42. The throttle is configured to adjust the amount of airflow flowing to the cylinder 30.

In this example, intake valve 52 and exhaust valves 54 may be actuated via an intake cam 51 and an exhaust cam 53. The timing of the intake cam 51 and the exhaust cam 53 may adjusted via a VCT system 200, shown in FIG. 2 and discussed in greater detail herein. The position of intake valve 52 and exhaust valve 54 may be determined by position sensors 55 and 57, respectively.

Fuel injector 66 is shown arranged in intake manifold 44 in a configuration that provides what is known as port injection of fuel into the intake port upstream of cylinder 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some examples, cylinder 30 may alternatively or additionally include a fuel injector coupled directly to cylinder 30 for injecting fuel directly therein, in a manner known as direct injection.

Ignition system 88 can provide an ignition spark to cylinder 30 via spark plug 92 in response to spark advance signal SA from controller 12, under select operating modes. Though spark ignition components are shown, in some embodiments, cylinder 30 or one or more other combustion chambers of engine 10 may be operated in a compression ignition mode, with or without an ignition spark.

Exhaust gas sensor 126 is shown coupled to exhaust passage 48 of exhaust system 50 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. In some examples, exhaust gas sensor 126 may be a first one of a plurality of exhaust gas sensors positioned in the exhaust system. For example, additional exhaust gas sensors may be positioned downstream of emission control device 70.

Emission control device 70 is shown arranged along exhaust passage 48 downstream of exhaust gas sensor 126. Emission control device 70 may be a three way catalyst (TWC), NOx trap, various other emission control devices, or combinations thereof. In some examples, emission control device 70 may be a first one of a plurality of emission control devices positioned in the exhaust system. In some examples, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory 106 (e.g., memory chip) in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

During operation, the cylinder 30 in the engine 10 typically undergoes a four stroke cycle: the cycle includes the intake stroke, compression stroke, expansion stroke, and exhaust stroke. In a multi-cylinder engine the four stroke cycle may be carried out in additional combustion chambers. During the intake stroke, generally, exhaust valve 54 closes and intake valve 52 opens. Air is introduced into cylinder 30 via an intake manifold, for example, and piston 36 moves to the bottom of the combustion chamber so as to increase the volume within cylinder 30. The position at which piston 36 is near the bottom of the combustion chamber and at the end of its stroke (e.g. when cylinder 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within cylinder 30. The point at which piston 36 is at the end of its stroke and closest to the cylinder head (e.g. when cylinder 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition devices such as a spark plug 92, resulting in combustion. Additionally or alternatively compression may be used to ignite the air/fuel mixture. During the expansion stroke, the expanding gases push piston 36 back to BDC. A crankshaft may convert piston movement into a rotational torque of the rotary shaft. Finally, during the exhaust stroke, exhaust valve 54 opens to release the combusted air-fuel mixture to an exhaust manifold and the piston returns to TDC. Note that the above is described merely as an example, and that intake and exhaust valve opening and/or closing timings may vary, such as to provide positive or negative valve overlap, late intake valve closing, or various other examples. Additionally or alternatively compression ignition may be implemented in the cylinder 30. It will be appreciated that the timing of the intake and exhaust valves in the aforementioned four stroke combustion process may be adjusted if desired via the VCT system 200, shown in FIG. 2.

FIG. 2 shows a schematic depiction of an example engine 10 including the VCT system 200 included therein. A top view of the engine 10 having the cylinder head 80 coupled to the cylinder block 82. As previously discussed, cylinders may be formed through the coupling of the cylinder head and the cylinder block. In the depicted example, the engine 10 includes a first cylinder 202 and a second cylinder 204. However, an engine having an alternate number of cylinders has been contemplated. The cylinder 30, shown in FIG. 1 may be the first cylinder 202 or the second cylinder 204 shown in FIG. 2.

The first cylinder 202 includes an intake valve 206 and an exhaust valve 208. Likewise, the second cylinder 204 includes an intake valve 210 and an exhaust valve 212. The intake valve 52 shown in FIG. 1 may be either of the intake valves (206 and 210). Likewise, the exhaust valve 54 shown in FIG. 1 may be either of the exhaust valves (208 and 212).

The engine 10 shown in FIG. 2 further includes an intake camshaft 214 having a first intake cam 216 configured to cyclically actuate the intake valve 206 and a second intake cam 218 configured to cyclically actuate the intake valve 210. Thus, the intake cams may act to open and close the intake valves. The intake cam 51 shown in FIG. 1 may be either the first intake cam 216 or the second intake cam 218.

Bearings 220 may be coupled to the intake camshaft 214. The bearings 220 are configured to enable rotation of the intake camshaft 214. Bearing caps coupled to (e.g., at least partially enclosing) the bearings may provide support to the bearings and therefore intake camshaft.

The engine further includes an exhaust camshaft 222 having a first exhaust cam 224 configured to cyclically actuate the exhaust valve 208 and a second exhaust cam 226 configured to cyclically actuate the exhaust valve 212. The intake camshaft 214 and the exhaust camshaft 222 may be rotationally coupled to the crankshaft 40, shown in FIG. 1. Belt, chains, sprockets, and/or other suitable coupling mechanism may be used rotationally couple the camshafts to the crankshaft.

Continuing with FIG. 2, bearings 228 may be coupled to the exhaust camshaft 222. The bearings 228 are configured to enable rotation of the exhaust camshaft 222. Bearing caps coupled to (e.g., at least partially enclosing) the bearings may provide support to the bearings and therefore exhaust camshaft. The exhaust cams may act to open and close the exhaust valves. Although the example engine 10 depicted in FIG. 2 includes two valves per cylinder. Other valve configurations have been contemplated. For example, each cylinder may include four or more valves per cylinder.

The VCT system 200 includes an intake valve timing actuator 230 (e.g., intake cam phaser) and an exhaust valve timing actuator 232 (e.g., exhaust cam phaser). The intake valve timing actuator 230 is configured to adjust the timing (e.g., advance and/or retard) of the intake camshaft 214 and therefore the intake valves (206 and 210). Additionally, the intake valve timing actuator 230 is rotationally coupled to the intake camshaft 214. Likewise, the exhaust valve timing actuator 232 is configured to adjust the timing (e.g., advance and/or retard) of the exhaust camshaft 222 and therefore the exhaust valves (208 and 212). Additionally, the exhaust valve timing actuator 232 is rotationally coupled to the exhaust camshaft 222.

The intake valve timing actuator 230 includes an intake-actuator housing 234 and an intake-actuator rotor 236. The intake-actuator rotor 236 may be fixedly coupled to the intake camshaft 214, in some examples. That is to say that that the relative position between the intake-actuator rotor and the intake camshaft does not change. Likewise, the exhaust valve timing actuator 232 includes an exhaust-actuator housing 238 and an exhaust-actuator rotor 240.

The intake valve timing actuator 230 further includes an intake-actuator mid-locking mechanism 242. The intake-actuator mid-locking mechanism 242 may include a pin 244. In some examples, the pin may be spring-loaded. The intake-actuator mid-locking mechanism 242 is configured to lock and unlock the intake valve timing actuator 230 in a mid-lock position (e.g., intermediate position) between fully advanced and full retarded. It will be appreciated, that the intake-actuator mid-locking mechanism 242 may also be configured to release the intake-actuator rotor 236 with the intake-actuator housing 234 from the mid-lock position.

The exhaust valve timing actuator 232 further includes an exhaust-actuator mid-locking mechanism 246. The exhaust-actuator mid-locking mechanism may include a pin 248. In some examples, the pin may be spring-loaded. The exhaust-actuator mid-locking mechanism 246 is configured to lock and unlock the exhaust valve timing actuator 232 in a mid-lock position (e.g., intermediate position) between fully advanced and full retarded. It will be appreciated, that the exhaust-actuator mid-locking mechanism 246 may also be configured to release the exhaust-actuator rotor 240 with the exhaust-actuator housing 238 from the mid-lock position.

A common locking-control valve 250 is also included in the VCT system 200. The common locking-control valve 250 may be a hydraulic common locking-control valve 250. Specifically in one example, the common locking-control valve 250 may be a common locking-control solenoid valve. The common locking-control valve 250 is configured to control both the intake-actuator mid-locking mechanism 242 and the exhaust-actuator mid-locking mechanism 246. When a common locking-control valve is used to control both intake and exhaust actuator mid-locking mechanisms the complexity of the VCT system is reduced when compared to prior VCT systems which may include one or more control valve per locking mechanism. The cost and size of the size of the VCT system may also be reduced when a single locking-control valve is used.

Arrow 252 denotes a hydraulic connection between the common locking-control valve 250 and the intake-actuator mid-locking mechanism 242. Likewise arrow 254 denotes a hydraulic connection between the common locking-control valve 250 and the exhaust-actuator mid-locking mechanism 246. Therefore, arrow 252 may denote an intake hydraulic control passage and an arrow 254 may denote an exhaust hydraulic control passages. In some examples, the intake hydraulic control passage and the exhaust hydraulic control passage may have an equivalent length. A hydraulic control passage length may be a line length of the passage, that is to say a length of a line traversing a center of a flow enclosure of the control passage from the inlet of the passage to an outlet of the passage. In the case of a passage having a circular or oval cross-section the line length may be the length of a central axis of the control passage. However, in other examples the length of the intake hydraulic control passage and the length of the exhaust hydraulic control passage may be within 5% or 10% of one another. Therefore in some examples, each of the hydraulic passage lengths may not surpass a threshold value which may be specified by some control valves for desired operation. Thus, mid-locking operation may be improved when the hydraulic control passages lengths are with 5% or 10% of each-other or are substantially equivalent. However, it will be appreciated that other control valves may not have threshold hydraulic control passage lengths, in other examples.

Oil may be used as the working fluid in the hydraulic passages. In such an example, the hydraulic control passages may be referred to as hydraulic oil control passages. However, other hydraulic fluid may be used in other examples. Additionally, the common locking-control valve 250 may have a single outlet in fluidic communication (e.g., direct fluidic communication) with the intake hydraulic control passage and the exhaust hydraulic control passage or in other examples separate outlets may be provided for the intake and exhaust hydraulic control passages. The oil which may be included in the hydraulic control passages (252 and 254) may be supplied from an engine lubrication system in some examples. The engine lubrication system may be configured to provide lubrication to a number of components in the engine and include an oil pan, an oil pump, etc.

THE VCT system 200 may further include an intake-actuator advanced-locking mechanism 256, an intake-actuator retarded-locking mechanism 258, an exhaust-actuator advanced-locking mechanism 260, and an exhaust-actuator retarded-locking mechanism 262. Each of the aforementioned advanced locking mechanisms (256 and 260) may be configured to substantially lock the corresponding valve timing actuator in an advanced position (e.g., fully advanced). Additionally, each of the aforementioned retarded locking mechanisms (258 and 262) may be configured to substantially lock the corresponding valve timing actuator in a retarded position (e.g., fully retarded). It will be appreciated that the advanced and retarded locking mechanism may also be unlocked. One or more of the advanced and/or retarded locking mechanisms may include a pin.

In some examples, the common locking-control valve 250 may be configured to control the locking and unlocking function of the advanced locking mechanisms (256 and 260) and the retarded locking mechanisms (258 and 262). Additionally it will be appreciated that in other examples the aforementioned advanced-locking mechanisms and retarded-locking mechanisms may not be included in the VCT system 200. Further in some examples, the advanced-locking mechanisms and/or retarded-locking mechanisms may be controlled by one or more control valves separate from the common locking-control valve 250. Additionally, the VCT system may lock the advanced and/or retarded locking mechanisms during an engine shut-down, in some examples.

An intake cam-phaser control valve 264 may also be included in the VCT system 200. The intake cam-phaser control valve 264 is configured alter the intake valve timing actuator 230 to adjust (e.g., discretely or continuously adjust) the cam position and therefore intake valve timing. Specifically, the relative position of the intake-actuator rotor 236 and the intake-actuator housing 234 in the intake valve timing actuator 230 may be adjusted to alter cam positions. Arrow 265 denotes the connection between the intake cam-phaser control valve 264 and the intake valve timing actuator 230. In some examples, the intake cam-phaser control valve 264 hydraulically controls the intake valve timing actuator 230, therefore arrow 265 may denote a hydraulic control passage. However, other control techniques have been contemplated.

Additionally, an exhaust cam-phaser control valve 266 may be included in the VCT system 200. The exhaust cam-phaser control valve 266 is configured alter the exhaust valve timing actuator 232 to adjust (e.g., discretely or continuously adjust) the cam position and therefore exhaust valve timing. Specifically, the relative position of the exhaust-actuator rotor 240 and the exhaust-actuator housing 238 in the exhaust valve timing actuator 232 may be adjusted to alter cam positions (e.g., phasing). Arrow 267 denotes the connection between the exhaust cam-phaser control valve 266 and the exhaust valve timing actuator 232. In some examples, the exhaust cam-phaser control valve 266 hydraulically controls the exhaust valve timing actuator 232, therefore arrow 267 may denote a hydraulic control passage. However, other control techniques have been contemplated.

The intake cam-phaser control valve 264 and/or the exhaust cam-phaser control valve 266 may be hydraulic control valves (e.g., solenoid valves). Again, oil which may be supplied from an engine lubrication system may be used as the hydraulic fluid in the aforementioned control valves. However, other hydraulic control techniques have been contemplated.

Controller 12 is in electronic communication with the common locking-control valve 250 denoted via arrow 268. Likewise, the controller 12 is in electronic communication with the exhaust cam-phaser control valve 266 denoted via arrow 270 and the intake cam-phaser control valve 264 denoted via arrow 272.

The controller 12 may be configured to adjust the mid-locking mechanisms (242 and 246) via the common locking-control valve 250. Specifically, in some examples the mid-locking mechanisms may have a default position in a locked position. That is to say, that without input from the common locking-control valve 250, the mid-locking mechanism (242 and 246) may revert to a locked position. Therefore, the common locking-control valve 250 may solely be configured to unlock the mid-locking mechanisms (242 and 246) in some examples. However, alternate mid-locking mechanism functionality has been contemplated. For example, the default positioned of the mid-locking mechanism may be in an unlocked position or the mid-locking mechanisms may not have a default position. The controller 12 may also be configured to adjust the intake cam-phaser control valve 264 and the exhaust cam-phaser control valve 266 to alter the intake and exhaust valve timing. In particular, the controller 12 may be configured to control the common locking-control valve 250 to lock and unlock both the intake and exhaust actuator mid-locking mechanisms (242 and 246) based on engine operating conditions. It will be appreciated that in other examples, a dedicated valve timing controller separate from controller 12 may be provided in the engine 10 to implement the aforementioned valve timing adjustment functionality. Further, it will be appreciated that the controller 12 may be configured to implement the method and routines described herein as well as other variants.

FIG. 3 shows another example engine 10. As shown, the engine 10 in FIG. 3 includes a first cylinder bank 300 and a second cylinder bank 302. Each cylinder bank may include one or more cylinders. Specifically, in some examples the first and second cylinder banks (300 and 302) may each have a similar configuration to the engine depicted in FIG. 2. Therefore, it will be appreciated that additional components may be included in the cylinder banks that are not shown in FIG. 3 such as camshafts, cams, bearings, cylinders, valves, etc.

As shown, the first cylinder bank 300 includes an intake valve timing actuator 304 and an exhaust valve timing actuator 306. Likewise, the second cylinder bank 302 includes an intake valve timing actuator 308 and an exhaust valve timing actuator 310. The valve timing actuators may each function in a similar manner to the valve timing actuators discussed above with regard to FIG. 2. Thus, each of the valve timing actuators includes housings 312 and rotors 314.

Each of the valve timing actuators (304, 306, 308, and 310) may also include a mid-locking mechanism 316. The mid-locking mechanisms 316, shown in FIG. 3, may have a similar functionality to the mid-locking mechanisms shown in FIG. 2. Thus, the mid-locking mechanisms 316 may be configured to lock their respective valve timing actuator in a mid-lock position between fully advanced and fully retarded.

A common locking-control valve 320 is also shown in FIG. 3. The common locking-control valve 320 may be positioned in a depression 322 between the first cylinder bank 300 and the second cylinder bank 302. Additionally, the common locking-control valve 320 may be configured to control adjustment (e.g., lock and/or unlock of all of the mid-locking mechanisms 316 shown in FIG. 3). In this way, the number of parts in the engine is reduced when compared to other VCT systems which may use four or more control valves to control operation of the mid-locking mechanisms (i.e., one or more control valves per mid-locking mechanism). However, in other examples the common locking-control valve 320 may be configured to solely control the intake mid-locking mechanisms or the exhaust mid-locking mechanisms. Additionally, the controller 12 may be configured to send control signals to the common locking-control valve 320.

It will be appreciated that the cylinders in the engine banks may be arranged in a number of suitable configurations (e.g., relative positions). For example, the cylinders in opposing cylinder banks may be arranged at non-straight angles relative to one another. This configuration may be referred to as a V-configuration. However, in other examples the cylinder banks may be arranged in a horizontally opposed configuration. Still further in other examples, the cylinders may be arranged in an inline configuration.

FIG. 4 shows an illustration of an example engine 10 including an example cylinder head 80. An example common locking-control valve 250 is depicted. The common locking-control valve 250 is mounted in the cylinder head 80 and specifically the cylinder head camshaft bearing cap 400 in the depicted example. However, other common locking-control valve positions have been contemplated such as in the cylinder block, front engine cover, or in other suitable engine components. Additionally, the intake cam-phaser control valve 264 and the exhaust cam-phaser control valve 266 are also shown. The common locking-control valve 250, the intake cam-phaser control valve 264, and the exhaust cam-phaser control valve 266 are positioned adjacent to a front end 450 of the engine 10, in the depicted example. However, in other examples the common locking-control valve 250, the intake cam-phaser control valve 264, and/or the exhaust cam-phaser control valve 266 may be located in other suitable positions, such as a rear end of the engine 10.

The intake valve timing actuator 230 and the exhaust valve timing actuator 232 are also shown. The valve timing actuators are generically depicted via boxes. However, it will be appreciated that the actuators have additional complexity that is not illustrated. Hydraulic control passages (252 and 254) are also shown. As illustrated, the hydraulic control passages (252 and 254) are routed through and traverse a portion of the cylinder head 80. However, external hydraulic control passages routing has also been contemplated. The intake camshaft 214 and the exhaust camshaft 222 are also shown in FIG. 4. As shown, bearing caps 410 surround the intake camshaft 214. The bearing caps 410 may support bearings, such as bearing 412. Additionally, bearing caps 414 surround the exhaust camshaft 222. The bearing caps 414 may support bearings, such as bearing 416.

FIGS. 1-4 provide for an engine system comprising a first valve timing actuator including a first actuator mid-locking mechanism, a second valve timing actuator including a second actuator mid-locking mechanism, a common hydraulic locking-control valve controlling the first actuator mid-locking mechanism and the second actuator mid-locking mechanism, a first hydraulic control passage in fluidic communication with the common hydraulic locking-control valve and the first actuator mid-locking mechanism, and a second hydraulic control passage in fluidic communication with the common hydraulic locking-control valve and the second actuator mid-locking mechanism.

FIGS. 1-4 also provide for the engine system including a third valve timing actuator including an third actuator mid-locking mechanism, a fourth valve timing actuator including a fourth actuator mid-locking mechanism, a third hydraulic control passage in fluidic communication with the common hydraulic locking-control valve and the third actuator mid-locking mechanism, and a fourth hydraulic control passage in fluidic communication with the common locking-control valve and the fourth actuator mid-locking mechanism, the common hydraulic locking-control valve controlling the third actuator mid-locking mechanism and the fourth actuator mid-locking mechanism.

FIG. 5 shows a method 500 for operation of an engine. The method may be implemented by the engine, systems, components, etc., described above with regard to FIGS. 1-4 or may be implemented by another suitable engine, systems, and components.

At 502 the method includes operating an engine with independent variable intake and exhaust valve timing with an intake valve timing actuator and an exhaust valve timing actuator. Operating the engine with independent variable intake and exhaust valve timing with an intake valve timing actuator and an exhaust valve timing actuator may include a 504 advancing and retarding the intake timing valve actuator with an intake cam-phaser control valve and at 506 advancing and retarding the exhaust valve timing actuator with an exhaust cam-phaser control valve. Therefore, the engine may be operated with variable intake and exhaust valve timing via the intake cam-phaser control valve and the exhaust cam-phaser control valve different from a common locking-control valve. In some examples, the intake and exhaust timing actuators may be advanced and retarded from mid-lock positions.

At 508 the method includes locking both the intake and exhaust valve timing actuators in a mid-lock position. In some examples, the method may include starting the engine with both the intake and exhaust valve timing actuators locked in the mid-lock position after 508 and before 510.

Next at 510 the method includes unlocking both the intake and exhaust valve timing actuators via a common locking-control valve. In some examples, the common locking-control valve may be a solenoid valve. Additionally, step 508 may be implemented during start-up engine operation and the step 510 may be implemented after the engine output surpasses a threshold speed. Specifically in one example, the locking may be effected during a previous engine shutdown before start-up engine operation and the unlocking may be implemented after engine output surpasses a threshold speed of the start-up engine operation.

At 512 the method includes selectively locking at least one of the intake valve timing actuator and the exhaust valve timing actuator in an advanced or a retarded position.

FIG. 6 shows a method 600 for operation of an engine. The method may be implemented by the engine, systems, components, etc., described above with regard to FIGS. 1-4 or may be implemented by another suitable engine, systems, and components.

During a first operating condition, the method includes at 602 locking both an intake valve timing actuator and an exhaust valve timing actuator in a mid-lock position, the actuators on a common cylinder bank. As discussed above with regard to FIG. 5, the engine may be started with both the intake and exhaust valve timing actuators locked in the mid-lock position, before the unlocking the intake and exhaust valve timing actuators from the mid-lock position, in some examples.

During a second operating condition, the method includes at 604 unlocking both the intake and exhaust valve timing actuators from the mid-lock position via a common locking-control valve and at 606 advancing and retarding intake valve timing with the intake valve timing actuator. Additionally, during the second operating condition the method includes at 608 advancing and retarding exhaust valve timing with the exhaust valve timing actuator. It will be appreciated that the intake valve timing may be advanced and retarded from the mid-lock position and the exhaust valve timing may be advanced and retarded from the mid-lock position, in some examples.

The first operating condition may be when engine speed is below a predetermined threshold value and the second operating condition may be when engine speed is above the predetermined threshold value. The first operating condition may be when the engine is performing a start-up operation. In other words, the engine may be started with both the intake and exhaust valve timing actuators in a mod-lock position. Furthermore, as previously discussed, the mid-lock position may be spaced away from, and between a full advance and full retarded position, for example at least 10% away from each of the full advanced and full retarded positions. Additionally, the intake valve timing actuator may be advanced or retarded via an intake cam-phaser control valve and the exhaust valve timing actuator may be advanced or retarded via an exhaust cam-phaser control valve.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and methods disclosed herein are exemplary in nature, and that these specific embodiments are not to be considered in a limiting sense, because numerous variations are possible. For example, the above technology can be applied to V-6, I-3, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operation of an engine comprising:
operating an engine with independent variable intake and exhaust valve timing with an intake valve timing actuator and an exhaust valve timing actuator;
locking both the intake and exhaust valve timing actuators in a mid-lock position; and
unlocking both the intake and exhaust valve timing actuators via a common locking-control valve that delivers hydraulic fluid through two parallel passages of equivalent length.

2. The method of claim 1, further comprising starting the engine with both the intake and exhaust valve timing actuators locked in the mid-lock position.

3. The method of claim 1, where locking is effected during a previous engine shutdown before start-up engine operation and unlocking is implemented after engine output surpasses a threshold speed of the start-up engine operation.

4. The method of claim 1, where the engine is operated with variable intake and exhaust valve timing via an intake cam-phaser control valve and an exhaust cam-phaser control valve separate from the common locking-control valve.

5. The method of claim 4, where operating the engine with independent variable intake and exhaust valve timing includes advancing and retarding the intake timing valve actuator with the intake cam-phaser control valve from its mid-lock position and advancing and retarding the exhaust valve timing actuator from its mid-lock position with the exhaust cam-phaser control valve.

6. An engine system comprising:
a first valve timing actuator including a first actuator mid-locking mechanism;
a second valve timing actuator including a second actuator mid-locking mechanism;
a common hydraulic locking-control valve controlling the first actuator mid-locking mechanism and the second actuator mid-locking mechanism;
a first hydraulic control passage in fluidic communication with the common hydraulic locking-control valve and the first actuator mid-locking mechanism; and
a second hydraulic control passage in fluidic communication with the common hydraulic locking-control valve and the second actuator mid-locking mechanism.

7. The engine system of claim 6, where the first valve timing actuator is positioned in a first cylinder bank and the second valve timing actuator is positioned in a second cylinder bank.

8. The engine system of claim 7, where cylinders in the first cylinder bank are arranged at non-straight angles with respect to corresponding cylinders in the second cylinder bank and the common hydraulic locking-control valve is positioned in a depression between the first cylinder bank and the second cylinder bank.

9. The engine system of claim 6, where the first valve timing actuator is an intake cam phaser and the second valve timing actuator is an exhaust cam phaser.

10. The engine system of claim 6, further comprising a third valve timing actuator including a third actuator mid-locking mechanism, a fourth valve timing actuator including a fourth actuator mid-locking mechanism, a third hydraulic control passage in fluidic communication with the common hydraulic locking-control valve and the third actuator mid-locking mechanism, and a fourth hydraulic control passage in fluidic communication with the common locking-control valve and the fourth actuator mid-locking mechanism, the common hydraulic locking-control valve controlling the third actuator mid-locking mechanism and the fourth actuator mid-locking mechanism.

11. The engine system of claim 6, where the first and second hydraulic control passages have an equivalent length.

12. The engine system of claim 6, further comprising a controller configured to control the common hydraulic locking-control valve to lock and unlock both the first and second actuator mid-locking mechanisms based on engine operating conditions.

13. The engine system of claim 6, where the first valve timing actuator includes a first actuator advanced-locking mechanism and a first actuator retarded-locking mechanism and the second valve timing actuator includes a second actuator advanced-locking mechanism and a second actuator retarded-locking mechanism.

14. The engine system of claim 6, where the first actuator mid-locking mechanism fixes a relative position of a first actuator rotor and a first actuator housing included in the first valve timing actuator.

15. The engine system of claim 6, where the common hydraulic locking-control valve is mounted in a cylinder head.

16. An engine method, comprising:
 during a first operating condition, concurrently locking both an intake valve timing actuator and an exhaust valve timing actuator in a mid-lock position; and
 during a second operating condition, concurrently unlocking both the intake and exhaust valve timing actuators from the mid-lock position via a common locking-control valve and advancing and retarding intake valve timing with the intake valve timing actuator and advancing and retarding exhaust valve timing with the exhaust valve timing actuator.

17. The method of claim 16, where the first operating condition is when engine speed is below a predetermined threshold value and the second operating condition is when engine speed is above the predetermined threshold value.

18. The method of claim 16, where the mid-lock position is between a full advance and full retarded position.

19. The method of claim 16, where the intake valve timing actuator is advanced and retarded via an intake cam-phaser control valve and the exhaust valve timing actuator is advanced and retarded via an exhaust cam-phaser control valve.

* * * * *